United States Patent [19]

Massie

[11] 3,880,719

[45] Apr. 29, 1975

[54] SOLAR STILL WITH REPLACEABLE SOLAR ABSORBING LINER AND WEIGHT CONTROLLED FEED INLET

[76] Inventor: Lewis Evans Massie, Box 79, Solana Beach, Calif. 92075

[22] Filed: Jan. 16, 1973

[21] Appl. No.: 324,070

[52] U.S. Cl. ............ 202/234; 202/190; 203/DIG. 1; 203/10; 203/196
[51] Int. Cl. ............................................. B01d 3/00
[58] Field of Search .................. 202/234, 236, 181; 203/DIG. 1, 1, 10; 222/56, 64, 415, 57, 58; 126/270

[56]  References Cited
UNITED STATES PATENTS

| 1,638,244 | 8/1927 | Cooke | 222/55 |
| 2,539,070 | 1/1951 | Gebo | 222/57 |
| 3,655,517 | 4/1972 | Hensley | 202/234 |

*Primary Examiner*—Norman Yudkoff
*Assistant Examiner*—F. Sever

[57] ABSTRACT

A solar energy operated still enclosed in a watertight, insulated, case having all intake and exit orifices sealed with valves or water traps. The still consisting of an evaporating tray of heat or solar energy absorbing surfaces in which the fluid to be distilled is exposed to the solar energy. The evaporating tray heat absorbing surfaces can be replaced or can be cleaned periodically or continuously by moving the tray over brushes and scrapers. The weight of the fluid in the evaporating tray causes a displacement or deflection of the tray support which is coupled to the intake and exit valves to control the level of fluid in the tray. The weighting mechanism has counterweights, or load springs, that can be preset to accommodate fluids of different densities or to preset the working level of the fluid in the tray.

3 Claims, 6 Drawing Figures

PATENTED APR 29 1975 3,880,719

3,880,719

SOLAR STILL WITH REPLACEABLE SOLAR ABSORBING LINER AND WEIGHT CONTROLLED FEED INLET

This invention relates to certain useful improvements in distillation systems using solar energy as the principal heat source.

The principal object of this invention is to provide a solar still for water, or other fluids, that is a practical and usable device for home or commercial installations.

That schemes for using solar energy to distill water are not new, is obvious when it is noted that 1972 is the centennial anniversary of the first production solar operated, salt-water, still installed in South America in 1872.

The search for more effective, and practical, solar stills has been accelerated in recent years by the need to conserve water and fossil energy sources. Potable drinking water is in greater demand and it is highly desirable to have available water of much better quality than that described by the United States Public Health Service Standards.

A review of recent inventions and such U.S. Department of Commerce reports as, Demineralization of Saline Water With Solar Energy PB 161 379 (1954), Development on an Improved Solar Still PB 181 144 (1962), New and Improved Methods for Lower Cost Solar Distillation PB 161-402 (1959), Second Two Years Progress on Study and Field Evalution of Solar Sea-water Stills PB Evaluation 185 487 (1965), reveals the concern of the U.S. Government for improving the state-of-the-art in solar distillation.

The effective and practical solar still is not only dependent upon the efficient conversion of solar input (insolation) into the heat needed to vaporize the fluid being distilled, but as in the case of drinking water, upon water quality management. Water quality management is concerned with the physical, chemical and biological parameters of water distillation and storage.

In solar stills of the type described in this invention, the fluid is heated by exposure to insolation in shallow trays having a surface which absorbs the maximum amount of heat energy. These trays are in closed containers having a cover transparent to the useful solar flux. An efficient arrangement requires that the depth of the water in the tray be the minimum that will not expose dry areas of the tray to the solar flux. The most common approach to fluid level control has been the use of float operated valves as described in U.S. Pat. No. 2,383,234 issued to W. S. Barnes Aug. 21, 1945 (see FIG. 7)

An evaporator tray having a surface that is effective in converting solar flux to heat is by its nature a good radiator of the collected heat. This radiated heat is lost unless means are provided for its utilization. The total quantity of heat available in the tray for a given time is known as the heat budget. The higher the temperature of the water entering the tray the less heat required to vaporize the fluid. If the waste heat from the tray is radiated to a heat exchanger incoming water can be heated thus conserving the heat budget and increasing the efficiency of the still.

The end products of tray distillation is a build-up of sediment and scale that not only decreases the depth of the tray but adversely affects the heat absorbing surface of the tray. If the fluid in the tray is not continuously used in the distillation process there is a tendency for organic growth and chemical slime to contaminate the tray. If allowed to overflow into the distilled fluid, it too will be contaminated. It is therefore essential that the evaporating tray be protected by a closed container and provided with a means to periodically, or continuously, clean the evaporating tray.

It is an objective of this invention to provide a solar still with an evaporating tray that is covered, or constructed of, a black pliable material that can be easily replaced, or continuously cleaned, or renewed.

It is an objective of this invention to use the weight of the fluid in the tray, or the deflection of the tray due to the weight of the fluid, to operate valves controlling the fluid level.

A further objective of this invention to provide counterweights, calibrated springs, or other counterloading mechanisms that can be adjusted to calibrate the fluid level control system to accommodate variations in fluid density and rate of fluid refill.

Another objective of this invention is to provide a heat exchange system to convert waste heat radiated from the evaporator tray, and other sources, to heat the incoming fluid.

It is also an objective of this invention to use the fluid monitoring system to detect the accumulation of excessive water in the evaporating tray and to vent this excess fluid without contaminating the interior of the still enclosure.

Another objective of this invention is to protect the integrity of the still enclosure by using valving, water traps, and other devices to prevent the entry of contaminants, insects, and other foreign matters.

To the foregoing objects, and others which may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

Figure 4:
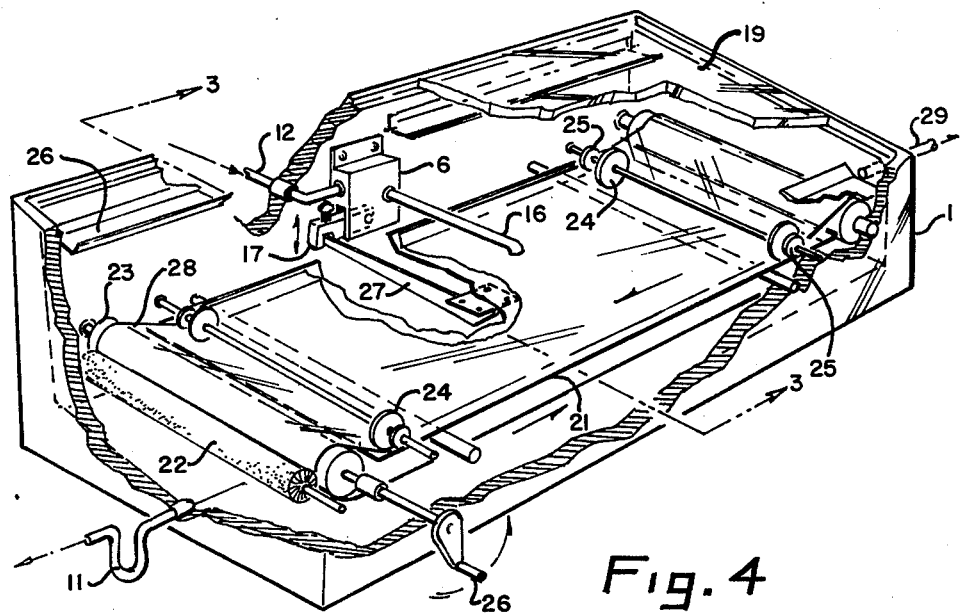
FIG. 4 is a side elevation of an alternate arrangement with a portion broken away along the section 3—3.

Referring now to the drawings, the numeral 1 designates a water-tight insulated case. Numeral 2 designates a tray in which the fluid to be vaporized is placed, tray 2 is supported by free swinging pivots, 3 and 4, and has a replaceable lining 18. Tray 2 also has an overflow outlet tube 9 which can open flap valve 10. Pivot arm 3 has an extension arm upon which an adjustable counterweight 5 can slide. Pivot arm 3 also has a cam 8 which engages the lever 17 of the valve 6. Valve 6 has an outlet tube 15 connected to inlet tube 12 through the heat exchanger 7. Numeral 19 designates a transparent window which allows the solar radiant energy to illuminate the tray 2. In FIG. 4, which shows an alternate evaporating arrangement, the rotating mechanism 28 designates a pliable heat absorbing material held in the form of a tray by rollers 24 and 25 and tapered rollers 23. In the continuous belt type of tray shown in FIG. 4 the rollers 23 permit movement of the pliable tray by crank drive 26. Drive 26 can be also driven by a gravity-powered mechanism as well as an electric motor. As the movable pliable tray is rotated over rollers 23, brushes 22 clean and restore the surface of the evaporating tray. Supporting plate 21 reinforces the bottom of the evaporating tray in its top position. Deflection of plate 21, due to the weight of fluid in the evaporating tray, operates lever 27 which in turn operates the spring loaded lever 29 of the fluid inlet valve 6.

Figure 1:
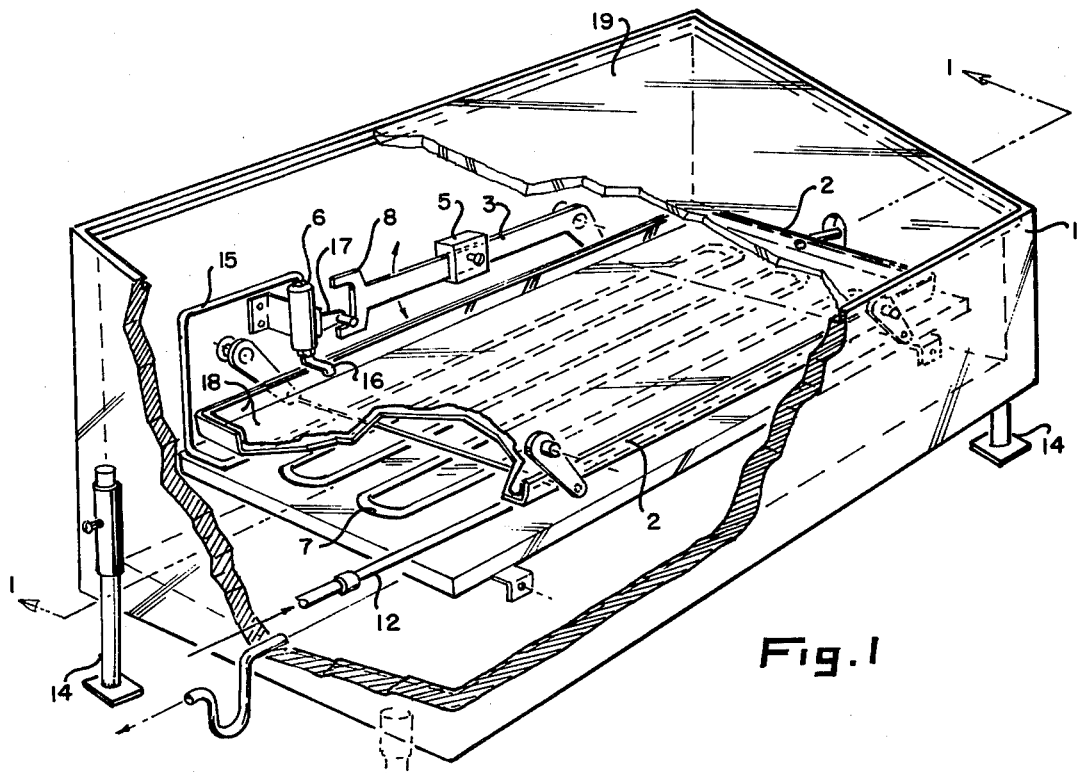
FIG. 1 is a side elevation view with a portion broken away along the section 2—2 of FIG. 2.
Figure 2:
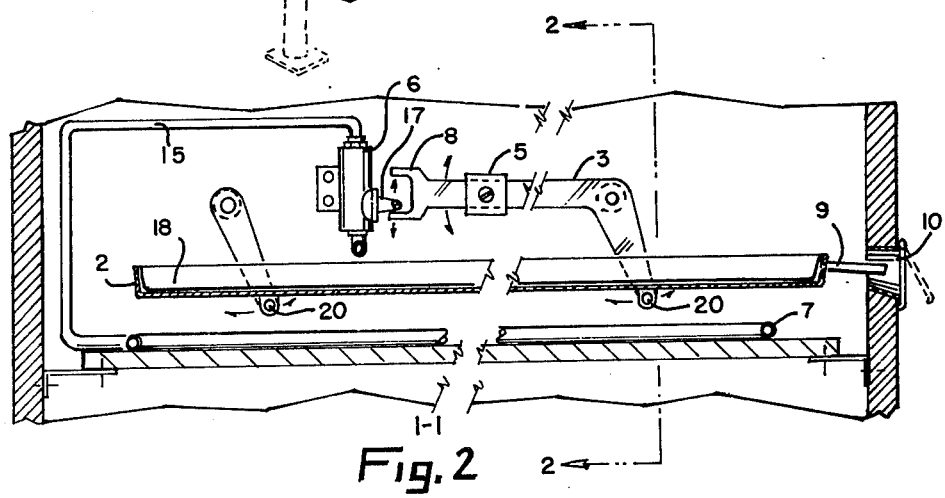
FIG. 2 is a longitudinal sectional view taken substantially on line 1—1 of FIG. 1.
Figure 3:
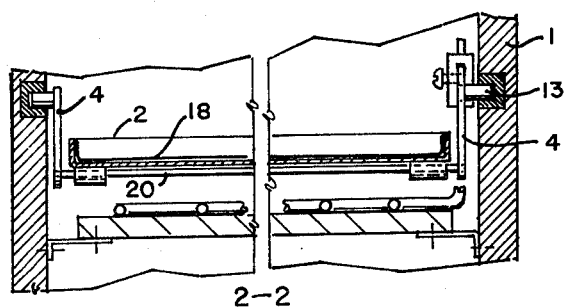
FIG. 3 is a longitudinal sectional view taken substantially on line 2—2 of FIG. 2.

In the use and operation of this device as illustrated in FIGS. 1, 2 and 3, the fluid to be distilled flows into the heat exchanger 7 through inlet tube 12. Valve 6 permits the fluid to flow into tray 2 until an amount predetermined by the position of counterweight 5 overcomes the counterweight allowing lever 3 and cam 8 to engage valve lever 17 and thus closing valve 6. If for any reason, such as a leaking valve 6, the fluid weight exceeds the predetermined amount the tray will swing to its lowest level and overflow tube 9 will push open flap valve 10 to discharge the excess fluid external to the case 1. The fluid in the tray will be heated by the solar energy to the vapor stage and the vapor flowing by convection will condense on the window 19 and the internal sides of the case 1 from where it will flow by gravity out of the case through water trap 11. Incoming fluid is stored in heat exchanger 7 where it is preheated by waste heat from tray before reaching valve 6 through tube 15. The inner surface of tray 2 is covered by a thin plastic or rubber liner 18 which is replaced when the end products of the distillation process reduce the liners effectiveness or it becomes contaminated.

Figure 5:
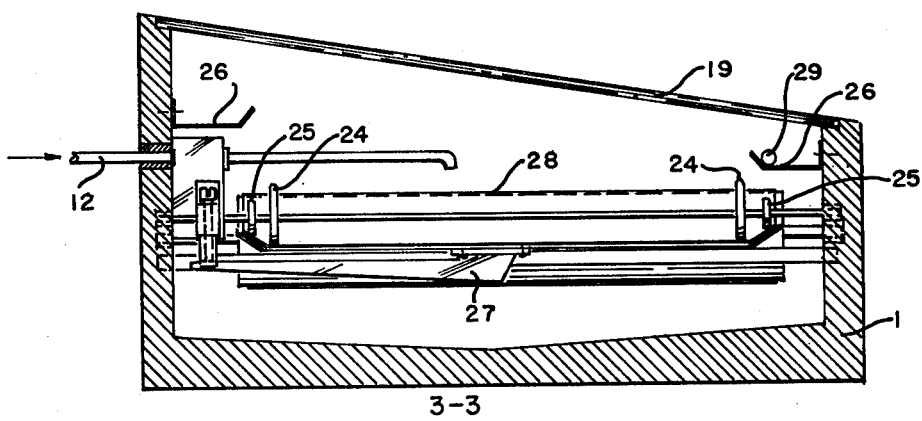
FIG. 5 is a longitudinal sectional view taken substantially on line 3—3 of FIG. 4.
Figure 6:
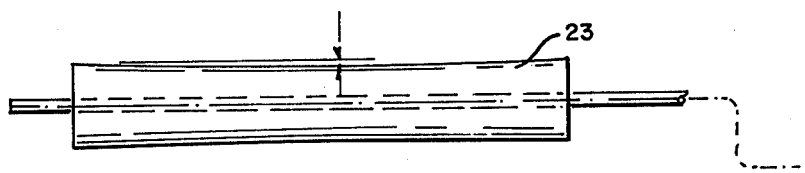
FIG. 6 is a detailed view of roller 23.

In the use and operation of the alternate design illustrated in FIGS. 4, 5 and 6 the rigid tray and liner shown if FIG. 1 is replaced by a continuous belt tray liner 28 which is constrained by rollers 24 and 25 to form a tray over supporting plate 21. The level of the fluid in tray 28 is controlled by valve 6 which in turn is controlled by the lever mechanism 27 which is operated by the deflection in support plate 21. Due to the weight of the fluid, the spring loaded lever 29 can be adjusted to accommodate fluids of various densities and depths.

Tray 28 has depressed front and rear lips due to the taper in roller 23 to permit excess fluid to flow to the bottom of Case 1 and out through water trap 11. To prevent contamination of the distilled fluid, it is collected in troughs 26 and flows out of the case 1 through tube 29.

While the embodiment of the invention illustrated on the drawings has been described with considerable particularity, it is to be understood that the invention is not restricted thereto, as the same is capable of receiving a variety of mechanical expressions, some which will now readily suggest themselves to those skilled in the art, while changes may be made in the details of construction and the arrangement and proportion of parts, and certain features may be used with other features, without departing from the spirit of the invention. Reference is therefore to be had to the appended claims for a definition of this invention.

What is claimed is:

1. A dimensionally rigid solar distillation apparatus including a frame comprising a generally flat base and a plurality of generally upright wall members extending upwardly and completely around said base and sloping from its highest to its lowest opposite wall, a cover transparent to solar heat radiation with a wetable lower surface, said apparatus having walls and base insulated against thermal transfer and the entire enclosure being water tight, said enclosure having an exit orifice for condensate accumulating in the bottom of the enclosure, within said enclosure a dimensionally rigid evaporator tray constructed of high thermal conductive material and having a replacable water tight liner of a black, solar absorbing material said tray level in the horizontal plane of the enclosure base supported on each side by two or more hinge arms rotating around their support pins at a fixed radius, said tray capable of moving vertically on the radial path described by the rotating hinge arms, said tray having a projecting overflow tube at one end and slightly below the vertical rim of the tray, said tube displacing a flapper valve in the end wall of the enclosure when the tray is at its lowest vertical position, said overflow tube allowing excess fluid in the tray to exit the enclosure, beneath said tray and in the same plane of the tray, a heat exchanger of coiled tubing, said heat exchanger absorbing heat radiated from the evaporating tray and the ambient heat of the enclosure to heat incoming fluid to the evaporating tray, a pivoted lever to couple the vertical movement of the evaporating tray to a fluid inlet valve, said lever having an adjustable counterweight, adjustment of the counterweight controlling the level of the fluid in the tray by modulating the action of the inlet valve, said counter weight and valve action also adjustable to suit the density of the incoming fluid, an inlet into the enclosure feeding the incoming fluid into the heat exchanger, from the heat exchanger into the fluid control valve.

2. In the solar still enclosure of claim 1, an evaporating tray consisting of a dimensionally rigid tray with short vertically continuous walls, said tray having a replaceable liner of black solar absorbing material.

3. In the solar still of enclosure of claim 1 a heat exchanger for heating the incoming fluid to the solar still, said heat exchanger consisting of passageways beneath and adjacent to the evaporating tray.

* * * * *